United States Patent [19]

Kita

[11] Patent Number: 5,298,553
[45] Date of Patent: Mar. 29, 1994

[54] COMPOSITION FOR USE IN SCULPTURING AND A PROCESS FOR MANUFACTURING A SCULPTURED PRODUCT

[75] Inventor: Masami Kita, Kobe, Japan

[73] Assignee: Daicel-Huls Ltd., Tokyo, Japan

[21] Appl. No.: 899,958

[22] Filed: Jun. 17, 1992

Related U.S. Application Data

[63] Continuation of Ser. No. 635,271, Dec. 28, 1990, abandoned.

[30] Foreign Application Priority Data

Dec. 28, 1989 [JP] Japan ................................ 1-343080
Nov. 26, 1990 [JP] Japan ................................ 2-322139

[51] Int. Cl.$^5$ ............................................. C08K 3/04
[52] U.S. Cl. ................................... 524/579; 524/432; 525/216
[58] Field of Search ................. 524/432, 579; 525/216

[56] References Cited

U.S. PATENT DOCUMENTS

| | | | |
|---|---|---|---|
| 3,846,365 | 11/1974 | Berg et al. ............................ | 524/528 |
| 3,921,333 | 11/1975 | Clendinning et al. .............. | 523/124 |
| 4,183,876 | 1/1980 | Coran et al. ........................ | 525/232 |
| 4,454,287 | 6/1984 | Liu ....................................... | 524/508 |

*Primary Examiner*—Paul R. Michl
*Assistant Examiner*—Edward Cain
*Attorney, Agent, or Firm*—Morgan & Finnegan

[57] ABSTRACT

Disclosed are a composition for use in sculpturing, which comprises a resin composition consisting essentially of a polyoctenamer resin and an inorganic filler, and a process for manufacturing a sculptured product comprising using a sculpturing material composition comprising a polyoctenamer resin.

The composition for use in sculpturing can be not only molded at moderate temperature by hands and a trowel but also sculptured or shaved with a chisel or a boaster, and even polished with a rasp or a sandpaper.

The composition can be made easier by mixing with an inorganic filler and said mixing provides excellent surface smoothness and massiveness effects in handling the sculptured products.

21 Claims, 2 Drawing Sheets

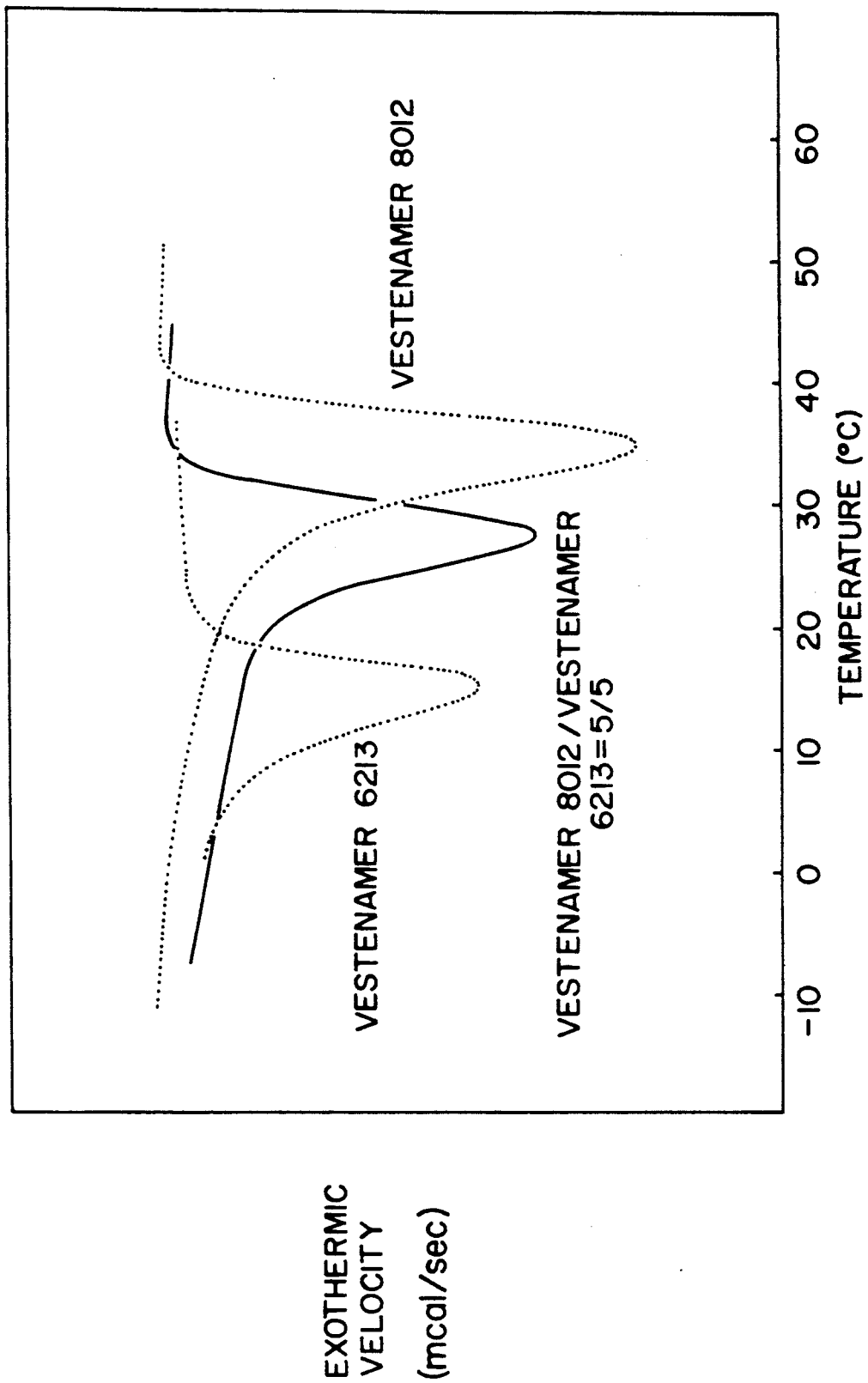

COMPOSITION FOR USE IN SCULPTURING AND A PROCESS FOR MANUFACTURING A SCULPTURED PRODUCT

This is a continuation of co-pending application Ser. No. 07/635,271, filed on Dec. 28, 1990 now abandoned.

FIELD OF THE INVENTION

The present invention relates to a composition for use in sculpturing which comprises a resin composition consisting essentially of a polyoctenamer resin and an inorganic filler, and also relates to a process for manufacturing a sculptured product.

The composition for use in sculpturing has excellent properties capable of being molded by hands at moderate temperatures, sculptured or shaved with a chisel, etc., and also of being polished or ground with a rasp, etc., in comparison with conventional sculpturing materials.

BACKGROUND OF THE INVENTION

Hitherto, materials for modeling and/or sculpturing composed of clays, used for the manual production of plastic representations or sculptures or the like of all types, for example, a plaster of Paris, an oil-based clay such as Plasticine (ex. U.S. Pat. No. 3,558,340, Japanese Patent Kokai No. 53436/1977, No. 36324/1979), an oil-based wheat flour (ex. Japanese Patent Kokai No. 111128/1976, No. 533/1977), a mixture of wood powder, hydrocarbon oil and rubber-reinforced styrene resin (ex. U.S. Pat. No. 4,624,976), a mixture of crushed paper or pulp and binding material (ex. Japanese Patent Kokai No. 1117/1975, No. 38427/1978), a mixture of synthesized latex, starch and bread powder (ex. U.S. Pat. No. 4,172,054), a mixture of polyvinyl alcohol powder and polyhydric alcohol (ex. Japanese Patent Kokai No. 125446/1976), and the like, are widely well known.

These materials for modeling and/or sculpturing have been widely used by professional sculptors, artists, non-professional hobbyist including student or children and other workers as pliable materials.

Thus, for example, U.S. Pat. No. 3,558,340 describes a process of coating an object of oil or wax-based modeling clay which comprises several steps.

On the other hand, U.S. Pat. No. 3,883,456 describes a modeling compound which comprises polyvinyl chloride powder and alkyl polyglycolether and kaolin, and the like.

Furthermore, U.S. Pat. No. 4,336,071 describes a plastic compound which is deformable by hand and serves for the production of models, motifs and other kinds of plastic representations.

The plastic compound for modeling contains binding agents such as polyvinyl chloride or cellulose ether or ceresin wax, plasticizers and/or solvents, as well as fillers such as aluminum hydroxide.

The above-mentioned compounds can be molded with dies or by hands, and be sculptured with a chisel or a boaster and also be polished with a rasp or a sandpaper.

However, the above-mentioned compounds have many problems or disadvantages as described hereinafter.

For example, typically, the compounds cannot be used repeatedly and, for example, a work-piece or product in a partially broken condition cannot be repaired or re-shaped, meaning that a change from the softened state to the solidified state is typically irreversible.

Furthermore, fine hair cracks in a work-piece or product tend to occur over a long after it has solidified.

And also, thin or fine parts are extremely difficulty to shape because of weak flexural strength or self-supporting ability.

There is also a problem of dusting arising during handling, generally be requirement of a long time for drying or solidification.

Another disadvantage is the difficulty in painting with colored paint brightly or clearly, because of a typical lack of smoothness or of the above-mentioned fine hair cracks of the surface.

It is also difficult to color such work-piece or product to be colored clearly by blending pigments or dyes.

In order to overcome the above disadvantages, various kinds of resins have recently been proposed.

Examples of these include epoxy resins, polyurethane resins, acrylic resins, and polycaprolactones.

Of the above-mentioned resins, however, epoxy resins and polyurethane resins can be used only in special cases because of their irreversible hardenability.

Acrylic resins can only be sculptured or shaved, and their softening temperature is high, which considerably restricts their scope of application.

On the other hand, a lactone resin such as a polycaprolactone resin is one of the thermoplastic resins which can be softened at temperatures of approximately 60° to 80° C., so that the lactone resins have recently been used as a resin for modeling compound.

For example, the polycaprolactone resin for kneading and modeling compound was disclosed in Japanese unexamined patent publication (Kokai) No. 42679/1986 [entitled "The Use of a Resin for Modeling Compound"].

Furthermore, Japanese unexamined patent publication(Kokai) No. 113457/1989 [entitled "A Resin composition and The Use of a resin for modeling compound"] and Japanese unexamined patent publication(Kokai) No. 213353/1989 [entitled "The Use of a resin for modeling compound"] disclose that the thermoplastic polycaprolactone is mixed with a chlorinated polyethylene or a chlorinated paraffin in order to delay the solidification process after softening.

Still further, Japanese unexamined patent publication(Kokai) No. 196090/1989 [entitled "The Use of a resin for modeling compound"] discloses that the thermoplastic polycaprolactone is mixed with a polycarbonate resin for lowering softening temperatures.

However, the caprolactone resin cannot be sculptured or shaved with a chisel or a boaster, etc., and cannot polished with a rasp or a sandpaper because of its hardness and hair cracks in spite of its moderate softening temperatures, that is, modeling temperatures and other excellent properties.

SUMMARY OF THE INVENTION

The present invention is the result of intensive research in order to develop a material having a sculpturing ability as well as a modeling ability at moderate temperatures.

It is a primary object of the present invention to solve the problem of the conventional polycaprolactone resin, etc., and to provide a composition for use in sculpturing, which can be not only molded by hands at moderate temperatures but also sculptured or shaved with a chisel or a boaster, etc., and even polished with a rasp or a sandpaper, etc.

As a result, the inventor of this invention has now found that it is possible to solve the problems as noted hereinabove by using of a polyoctenamer resin.

Figure 1:
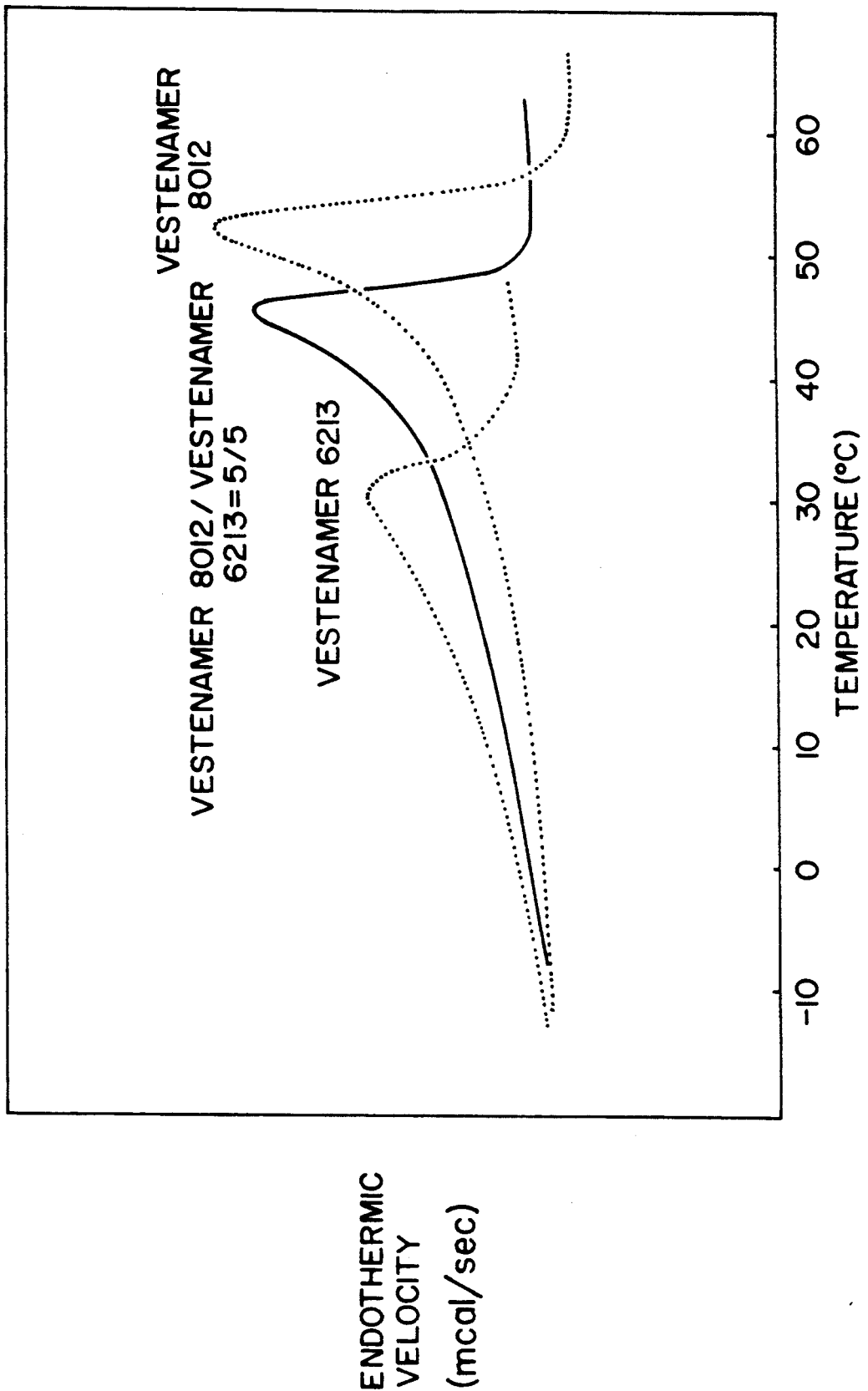
FIG. 1 is a chart of measurements taken with a differential scanning calorimeter (DSC), in which the curves of melting processes are illustrated with regard to a unitary type of polyoctenamer resin and a resin composition containing two different types of polyoctenamer resins, respectively.

A solid line illustrates the curve of melting processes with regard to a resin composition blended in a ratio of 50/50.

FIG. 2 is a chart of the DSC measurements, illustrating the curves of crystallization processes, respectively.

DETAILED DESCRIPTION OF THE INVENTION

The present invention will be described hereinafter in more detail.

According to a first aspect, the invention provides a composition for use in sculpturing which comprises a resin composition consisting essentially of a polyoctenamer resin and an inorganic filler.

According to a specific feature, this polyoctenamer resin has a molecular weight of more than 10,000.

This polyoctenamer resin can typically be prepared by a polymerization of cyclooctene, in which one double bond is located between two units of repeated 8 methylene groups.

Advantageously, the molecular weight of the polyoctenamer resin ranges between 10,000 to 150,000 and a most preferable molecular weight ranges between 80,000 to 120,000.

With respect to the molecular weight of the polyoctenamer resin, it has been found that when the molecular weight is less than 10,000, the mechanical strength of the polyoctenamer resin becomes insufficient so that it is preferred to have a lower limit in the molecular weight of 10,000.

On the other hand, when the molecular weight of the polyoctenamer resin is more than 150,000, the polyoctenamer resin becomes too hard to be sculptured or shaved with a chisel, and accordingly, it is preferred to have an upper limit in molecular weight of about 150,000.

According to another specific feature, the degree of crystallinity of the polyoctenamer resin is preferably more than 5%, and still preferably more than 10%.

According to another specific feature, the polyoctenamer resin has a glass transition temperature ranging between −80° C. to −30° C., and a melting temperature ranging between 5° and 80° C.

According to another specific feature, the polyoctenamer resin has a high trans-content, advantageously of at least 50%.

In general, the trans-cis ratio of the double bonds influences the degree of crystallinity of the polyoctenamers.

A greater crystallinity and consequently a higher melting temperature is obtained with increasing trans-content.

The polyoctenamer resin used in the present invention as a basic constituent in the composition for sculpturing material is a known plastic material. The unmodified resin alone is relatively brittle in mechanical strength, in industrial uses.

Processes for preparing a polyoctenamer resin are disclosed for example in the documents U.S. Pat. No. 3,798,185, U.S. Pat. No. 3,849,509, U.S. Pat. No. 4,095,033, U.S. Pat. No. 3,804,804 and U.S. Pat. No. 3,836,593.

Hitherto, the polyoctenamer resins have been used as a carcass for tires, bottom parts of radial tires when mixed with fillers, sealings for bicycles, a profile for assembly in car internal parts, reinforced hoses, etc., by mixing with various other resins after vulcanizing thereof in order to improve mechanical strength.

It is known from the prior arts that the polyoctenamer resin can be prepared by a polymerization of cyclooctene, for example by a metathesis polymerization method, as disclosed in U.S. Pat. No. 3,836,593, which is one of the various known manufacturing methods.

It is also known from the prior arts that cyclooctene can be prepared, for example, by dimerization of 1,3-butadiene via 1,5-cyclooctadiene having two double bonds present, followed by a hydrogenation reaction to one double bond of the two initial double bonds, which is one of the known manufacturing methods.

It is also known from the prior arts that, by adjusting the polymerization conditions, notably the polymerization temperature and polymerization time, it is possible to adjust the molecular weight of the polyoctenamer resin and the trans-cis ratio of the double bonds and accordingly the degree of crystallinity of the polyoctenamers.

The polyoctenamer resin used in the present invention is not vulcanized and has a modeling ability(pot life) and sculpturing readiness due to its moderate brittleness compared with conventional materials for modeling and/or sculpturing during a sufficient period of time, which makes it an appropriate material for sculpturing and/or modeling.

Such a polyoctenamer resin is available on the market under the trademark Vestenamer ® of the German firm HUELS AG, for instance the polyoctenamer resin Vestenamer 8012 ® has a trans-content of approximately 80% and a molecular weight of about 100,000 with a melting temperature of approximately 54° C., whereas the polyoctenamer resin named Vestenamer 6213 ® has a trans-content of approximately 60%, a molecular weight of 120,000 and a melting temperature of about 33° C.

According to another specific feature, when it is sought to reach an improved pot life, the sculpturing material composition comprises at least one polyoctenamer resin of high molecular weight admixed with a polyoctenamer resin of low molecular weight, preferably the molecular weight of the high molecular weight polyoctenamer resin ranges between 120,000 and 300,000, whereas the molecular weight of the low molecular weight polyoctenamer resin ranges between 1,000 and 100,000.

The relative weight ratio of the high molecular weight of polyoctenamer resin versus the low molecular weight polyoctenamer resin preferably ranges between 1/9 and 8/2.

According to another specific embodiment, a sculpturing material composition of improved pot life is obtained by admixing the polyoctenamer resin with a polyolefin.

This polyolefin is preferably selected from the group consisting essentially of a polyethylene, a polypropylene and a polyisobutylene, in particular comprises a polyisobutylene.

According to another embodiment, an improved pot life is obtained by admixing the polyoctenamer resin with a rubber of low molecular weight. Examples of such rubber are an unvulcanized natural rubber, an unvulcanized synthetic rubber, an unvulcanized polybutadiene rubber and an unvulcanized polyisoprene rubber.

According to the present invention, the polyoctenamer resin is admixed with an inorganic filler preferably having a high density, in particular ranging between 2 and 9.

Said inorganic filler can be selected from the group consisting of conventional fillers for plastics comprising zinc oxide, calcium carbonate, titanium dioxide, silica, a powdered glass and or a powdered metal, etc.

The weight content of the inorganic filler preferably ranges between 10 and 95%, and more preferably between 50 and 75% based on the total weight.

According to another specific embodiment, the composition for use in sculpturing also comprises an effective amount of at least one deodorizer.

This deodorizer is advantageously selected from the group comprising an organic deodorizer comprising benzaldehyde, glyoxal, formalin, and peracetic acid; an inorganic deodorizer comprising hydrogen peroxide and hypochlorous acid.

The composition for use in sculpturing can be advantageously formulated in the form of granules, in particular having a grain size ranging between 0.5 mm and 5 mm.

The composition can be colored with a pigment or a dye.

The composition can also be admixed with a thermoplastic resin, and preferably with a polyisobutylene.

On the other hand, the softening temperatures of the polyoctenamer resin can also be adjusted by mixing with polyolefins.

According to a second aspect, the present invention provide a process for manufacturing a sculptured product comprising using a polyoctenamer resin.

The polyoctenamer resin is preferably as above-defined for the sculpturing material composition.

FIG. 1 is a chart showing DSC measurements, in which the curves of melting processes are illustrated with regard to a unitary type of the polyoctenamer resin and a resin composition containing two different types of the polyoctenamer resins, respectively.

The temperature (°C.) are shown in abscissa, and the endothermic velocity(m cal/sec) in ordinate.

FIG. 1 clearly shows that the resin composition containing two resins of different type starts to melt at lower temperature ranges than the high molecular type resin, and that the melting temperature is higher than room temperatures.

FIG. 2 is also a chart showing DSC measurement, in which the curves of crystallization processes are illustrated, respectively.

FIG. 2 clearly shows that the resin composition containing two different types of resins starts to crystallize at lower temperature ranges than the high molecular type resin (Vestenamer 8012 ®).

As a result, workability in sculpturing is found to be considerably improved.

The temperatures (°C.) are shown in abscissa, and the endothermic velocity(m cal/sec) in ordinate.

The areas surrounded by the respective curves in FIG. 2 correspond to the respective degrees of crystallinity.

The area surrounded by the curve regarding the resin composition is smaller than the area surrounded by the curve regarding the resin having lower molecular weight (Vestenamer 8012 ®), and larger than the area surrounded by the curve regarding the resin having higher molecular weight (Vestenamer 6213 ®).

It is noted that DSC measurement conditions and meaning of the resulting data are as follows.

Differential scanning calorimeter (DSC-2C: manufactured by Perkin Elmer Corporation). n-Octane and indium were applied for the purpose of calibration of temperatures.

Melting behaviors were carried out at the scanning rate of 10 degree/minute in nitrogen gas stream and the resulting peak temperatures of the thermogram are shown in FIG. 1.

The onset temperatures correspond to the minimum softening temperature of compositions for sculpturing.

The temperature is suitable between 30° and 53° C., preferably from 40° to 45° C. On the other hand, crystallization processes were carried out at a scanning rate of $-10$ degree/minute and the resulting onset temperatures of the thermogram peak step are also shown in FIG. 2.

The temperatures relatively correspond to the solidifying temperature of a composition for sculpturing.

The temperature is suitable for between 15° and 35° C.

When the temperature is not below than 35° C., then solidifying velocity is faster, and when the temperature is not over than 15° C., then solidifying velocity is slower.

Vestenamer 6213 ® is lower in the degree of crystallinity and thus softer, so that it is somewhat low in mechanical strength.

On the other hand, Vestenamer 8012 ® is higher in the degree of the crystallinity and thus harder, so that it is also somewhat difficult to sculpture.

The resin composition composed of Vestenamer 6213 ® and Vestenamer 8012 ® is moderate in the degree of crystallinity and thus moderately hard, so that it is easier to sculpture.

As described hereinabove, the difference in calorimetric analysis behavior between a unitary type of resin and a mixed resin composition is revealed as the difference in readiness to be sculptured.

Mixing ratio of Vestenamer 8012 ® to Vestenamer 6213 ® is preferably from 9/1 to 2/8.

Where the mixing ratio of Vestenamer 8012 ® is more than 9/1, the mixed resin composition is somewhat hard.

On the other hand, where the mixing ratio of Vestenamer 8012 ® is not more than 2/8, the mixed resin composition is rather low in hardness.

As described hereinabove, even the present composition containing only the polyoctenamer resin can be sculptured with a chisel, etc.

However, a resin composition consisting essentially of a polyoctenamer resin and an inorganic filler of high density, is more suitable for a material for sculpturing because, not only it is capable of being easily sculptured with a chisel, etc., it offers also a more attractive surface smoothness and a massiveness effect when handled.

It is noted that the polyoctenamer resin alone has a low density, for example, 0.91 in Vestenamer 8012® and 0.89 in Vestenamer 6213®, this resulting in cheapish-feeling as the sculptured products such as ornaments, etc.

The cheapish-feeling in the ornaments, etc., can be improved by an addition of an inorganic filler of high density.

Examples of the inorganic fillers include conventional fillers for plastics, such as zinc oxide, calcium carbonate, titanium dioxide, silica, a powdered glass and or a powdered metal, etc.

Zinc oxide can be more preferably used because of excellent surface smoothness in sculptured products such as an ornament, etc.

The fillers content is from 95% to 10% by weight, more preferably 50 to 75% by weight based on the total weight.

When the content is less than 10%, the above-described advantages are not be found.

If, on the other hand, the content is more than 90%, the composition is too brittle to be sculptured.

Furthermore, a higher content of the inorganic fillers can improve the deformation resistance of a sculptured ornament, that is, the creep resistance in the sculptured products, because the polyoctenamer resins have relatively low softening temperatures.

It is noted that the polyoctenamer resin as used in the present invention exhales a peculiar odor which may be disadvantageous depending upon the uses.

Though the peculiar odor can be effectively removed by an extraction of low molecular weight components, an addition of various kinds of deodorizers is also effective because of a convenient method.

Specific examples of the deodorizers having remarkable effectiveness include unlimitedly an organic compound such as benzaldehyde, glyoxal, formalin, and or peracetic acid, etc.

Commercial products of the very effective deodorizers include ACRYACE(supplied by Ryoto Chemical, Ltd), RAN-10 and MU-357(supplied by Tokuyama Soda, Ltd), etc.

Specific examples of the inorganic deodorizers include unlimitedly hydrogen peroxide or hypochlorous acid, etc.

Commercial products of the very effective inorganic deodorizers include BK-113(supplied by Sumitomo Alumina, Ltd), NA-1303(supplied by Yamajin Sangyo, Ltd), etc.

It is noted that one or more than 2 of the deodorizers can be used, the combined use of the deodorizers being more effective.

The material for sculpturing to be used in the present invention is usually supplied to users in the form of granule-shaped resin.

Molding methods for preparing an original mold before sculpturing or shaving with a chisel or a booster, such as, an injection molding machine or a compression molding machine for conventional plastics, are preferably applied.

And, when preparing a complicate shape original mold, for example, the granule-shaped resin can be immersed into warm or hot water to soften, and then can be freely kneaded and modeled by hands or with a trowel and/or a spatula, etc.

Moreover, it is preferable to prepare several pieces of small blocks capable of being combined together to form a roughly outlined mold before sculpturing, and the combined blocks can be partially softened for embodying with a blowing heater or hot water.

The embodied blocks can also be used as an ornament or a decoration even without sculpturing or shaving.

However, the embodied blocks are preferably sculptured or shaved with a chisel, etc., in order to complete more precisely the fine parts thereof.

Furthermore, the finely completed blocks can also be finally polished with a rasp or a sandpaper, etc., in order to finish up the surface smoothness thereof.

Still further, the material for sculpturing can also be colored by mixing pigments or dyes before being embodied and/or sculptured, either during the preparation of the granule-shaped resin or after being embodied and/or sculptured.

In addition, the material for sculpturing which comprises a polyoctenamer resin can also be mixed with various stabilizers, UV absorbents, plasticizers for conventional resins, and also other thermoplastic resins such as a polyisobutylene, etc.

Mixing with the other thermoplastic resins can improve brittleness of the polyoctenamer resin.

The above-described various additives can be readily added to the polyoctenamer resin with an extruder, and an internal mixer such as Banbury mixer or a roll for rubber processing.

The following Examples are given to illustrate the practice of this invention but they are not intended in any way to act to limit the scope of this invention.

EXAMPLE 1

A plurality of blocks capable of being assembled together were molded from a mixture containing 50 parts by weight of Vestenamer 8012® resin and 50 parts by weight of zinc oxide with an injection molding machine.

The blocks were assembled to form a roughly-shaped car model, then they are partially softened with a conventional hair dryer to prepare an original car model.

The original car model was partially shaved with a knife to modify the fine parts thereof, then it was polished with a sandpaper to prepare a car-shaped ornament having excellent surface appearance.

EXAMPLE 2

Vestenamer 8012® and Vestenamer 6213®, which are polyoctenamer resins of different molecular weight, respectively, were melted in the ratio of Vestenamer 8012®/Vestenamer 6213®=7/3 together with 75% by weight of zinc oxide based on the total weight with an extruder for conventional plastic resins to prepare mixed granules.

A ship-shaped die was charged with the mixed granules, then heated to softening temperature and compressed with a compression molding machine to prepare a ship-shaped original model, followed by cooling to be taken out from the die.

The ship-shaped original model was partially shaved with a knife to remove flashes and edges in order to prepare a ship-shaped ornament having excellent appearance.

EXAMPLE 3

100 parts by weight of Vestenamer 8012® and 10 parts by weight of Vestenamer L3000®, which is a wax-like polyoctenamer resin having low molecular weight, were melted and mixed together with 220 parts by weight of zinc oxide in an extruder for conventional plastic resins, to prepare mixed granules.

The mixed resin granules were softened in water heated to 60° C. and a statue mold was prepared by hands and a trowel according to a clay-modeling method.

The modeling time was extended owing to the addition of Vestenamer ® having low molecular weight, therefore very easy to model.

Furthermore, fine parts of the statue mold were able to be readily modified by partially softening with a hot-air blower and readily sculptured with chisels to prepare a statue ornament of graceful appearance and massiveness in handling.

EXAMPLE 4

100 parts by weight of Vestenamer 6213 ® and 5 parts by weight of a polyisobutylene(VISTANEX LM: supplied by Exxon Chemical, Ltd.) were melted and mixed together with 105 parts by weight of calcium carbonate in an extruder for conventional plastic resins, to prepare mixed granules.

The mixed resin granules were softened in water heated to 50° C., and a fruit-shaped mold was prepared by hands and a trowel according to a clay-modeling method.

Successively, the mold was solidified at room temperature and polished with a rasp, then it was painted with oil-soluble type color paints to prepare an excellent food sample for exhibiting in restaurants' show-case, etc.

COMPARATIVE EXAMPLE 1

The same procedures as described in Example 1 was repeated, except that a polycaprolactone resin having relative viscosity value of 2.34 (PCL-H5: supplied by Daicel Chemical Industries Co., Ltd.) was used instead of Vestenamer 8012 ® resin to prepare an original car model.

The original car model was then sculptured with a chisel.

However, it was found difficult to sculpture, because of its hardness. Furthermore, though the original car model was polished with a sandpaper in order to smooth the surface, the polished surface was, contrary to expectations, roughened.

It is noted that Vestenamer 6213 ®/8012 ®/L3000 ® (registered trademarks of Huels AG in Germany) have the properties described hereinafter.

| | Vestenamer 6213 ®/8012 ®/L3000 ® |
|---|---|
| Molecular weight, Mw (GPC): | 120,00/100,000/1,200 |
| Melting point (DSC): | 33° C./<54° C./— |
| Glass transition Temperature: | −75° C./−65° C./— |
| Density at 20 C. (g/mL): | 0.89/0.91/0.885 |
| Apparent Density (g/mL): | 0.46/0.53/— |
| Crystallinity at 23° C.: | 10%/27%/— |
| Mooney viscosity (ML) at 100° C.: | <10/<10 |
| trans/cis ratio of double bonds (IR): | approx. 60/40/80/20/78/17 |

While the invention has been described in detail and with reference to specific embodiments thereof, it will be apparent to one skilled in the art that various changes and modifications can be made therein without departing from a spirit and scope thereof.

What is claimed is:

1. In a process for manufacturing a sculptured product comprising sculpturing a sculpturing material composition the improvement comprising using as the sculpturing material composition a resin composition consisting essentially of non-vulcanized polyoctenamer resin and an inorganic filler.

2. A method as set forth in claim 9, wherein said resin composition is a mixture composed of two kinds of polyoctenamer resins having different molecular weight.

3. A method as set forth in claim 1, wherein the content of said inorganic filler is from 10 to 95% by weight based on the total weight.

4. A method as set forth in claim 1, wherein the content of said inorganic filler is from 50 to 75% by weight based on the total weight.

5. A method as set forth in claim 1, wherein said resin composition further contains a polyisobutylene resin.

6. A method as set forth in claim 1, wherein said resin composition further contains a deodorizer.

7. A method as set forth in claim 1, wherein said resin composition further contains a dye or a pigment for coloring.

8. A process as set forth in claim 1, wherein said sculpturing composition contains zinc oxide as an inorganic filler.

9. A sculpturing composition capable of being molded by hand at moderate temperatures, sculptured or shaved with a chisel, etc. and also being capable of being polished or ground with a rasp, etc., said sculpturing composition consisting essentially of a resin composition and an inorganic filler wherein said resin composition is a mixture composed of two kinds of non-vulcanized polyoctenamer resins having different molecular weight.

10. A composition as set forth in claim 9, wherein said resin composition contains zinc oxide as an inorganic filler.

11. A composition as set forth in claim 9, wherein the content of said inorganic filler is from 10 to 95% by weight based on the total weight.

12. A composition as set forth in claim 9, wherein the content of said inorganic filler is from 50 to 75% by weight based on the total weight.

13. A composition as set forth in claim 9, wherein said resin composition further contains a polyisobutylene resin.

14. A composition as set forth in claim 9, wherein said resin composition further contains a deodorizer.

15. A composition as set forth in claim 9, wherein said resin composition further contains a dye or a pigment for coloring.

16. A sculpturing composition capable of being molded by hand at moderate temperatures, sculptured or shaved with a chisel, etc. and also being capable of being polished or ground with a rasp, etc., said sculpturing composition consisting of essentially a resin composition and an inorganic filler, wherein said resin composition is a mixture composed of polyoctenamer resin and a polyisobutylene resin.

17. A composition as set forth in claim 16, wherein said resin composition contains zinc oxide as an inorganic filler.

18. A composition as set forth in claim 17, wherein the content of said inorganic filler if from 10 to 95% by weight based on the total weight.

19. A composition as set forth in claim 17, wherein the content of said inorganic filler is from 50 to 75% by weight based on the total weight.

20. A composition as set forth in claim 17, wherein said resin composition further contains a deodorizer.

21. A composition as set forth in claim 17, wherein said resin composition further contains a dye or a pigment for coloring.

* * * * *